3,652,540
NOVEL ION EXCHANGERS ON THE BASIS OF CELLULOSE AND A METHOD FOR PREPARING THE SAME
Helmut Determann, Frankfurt am Main-Niederrad, and Theodor Wieland, Heidelberg, Germany, assignors to Pharmacia Fine Chemicals AB, Bjorkgatan, Uppsala, Sweden
No Drawing. Filed Feb. 6, 1970, Ser. No. 9,400
Claims priority, application Sweden, Feb. 7, 1969, 1,646/69
The portion of the term of the patent subsequent to Aug. 3, 1988, has been disclaimed
Int. Cl. C08b 11/04, 11/14, 29/03
U.S. Cl. 260—232 A
9 Claims

ABSTRACT OF THE DISCLOSURE

A novel ion-exchanger consisting of rounded particles of regenerated cellulose substituted by groups of the formula —$R_1$—Z, wherein $R_1$ stands for a lower alkylene group, containing 1-3 carbon atoms and optionally substituted with a hydroxyl group, and Z stands for a carboxylic, sulfo or phosphono group, or salts thereof, or an amino group of the formula

or a quaternized amino group of the formula

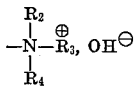

or salts thereof, wherein $R_2$, $R_3$ and $R_4$ each stand for hydrogen or an optionally hydroxyl group-substituted lower alkylene group, containing 1-4 carbon atoms, the substitution degree corresponding to an ion exchange capacity within the limits of 0.2–1.8 milliequivalents per gram of dry substance, preferably 0.5–1.2 milliequivalents per gram of dry substance, said particles containing from 2 to 25 percent of cellulose, calculated as unsubstituted product in weight per volume, and presenting pores substantially in the range of from 2 to 2000 m$\mu$ is disclosed.

---

The present invention concerns novel ion-exchangers on the basis of cellulose and a method for producing same. More particularly the invention concerns ion-exchangers consisting of rounded particles of cellulose substituted with groups of the formula —$R_1$—Z, wherein $R_1$ is a lower alkylene group containing 1-3 carbon atoms and optionally substituted with a hydroxyl group, and Z is a carboxylic, sulfo or phosphono group, or salts thereof, or an amino group of the formula

or a quaternized amino group of the formula

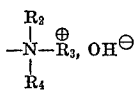

or salts thereof, wherein $R_2$, $R_3$ and $R_4$ are each hydrogen or an optionally hydroxyl-group substituted lower alkyl group, containing 1-4 carbon atoms, the substitution degree corresponding to an ion exchange capacity within the limits of 0.2–1.8 milliequivalents per gram of dry substance, preferably 0.5–1.2 milliequivalents per gram of dry substance.

Such ion exchangers are previously known. For their preparation there may be used so-called fibre cellulose as a starting material, said cellulose being substituted by ion-exchanging groups. As an agent for the introduction of these groups may be used, for example, triethanolamine, which is attached to the cellulose by means of epichlorohydrin (ECTEOLA-cellulose). In another method of preparing ion-exchangers on the basis of cellulose fibre cellulose is treated with a substance having the formula X$R_1$Z, wherein X is halogen, preferably chlorine or bromine, and $R_1$ and Z each has the above significance, for introducing groups of the formula $R_1$Z while splitting off the corresponding hydrogen halide, which is neutralized by an alkaline substance such as sodium hydroxide. Thus if the substance having the formula X$R_1$Z is diethylaminoethyl chloride the fibre cellulose will be substituted with diethylaminoethyl groups (DEAE-cellulose). As a cellulose starting material for the preparation of ion-exchangers it is also possible to use so-called micro-crystalline cellulose. Such a cellulose can be obtained by removing the amorphous parts of the cellulose, by means of different methods of treatment such as with diluted acids, so that only crystalline fields remain. The types of cellulose ion-exchangers set forth all have the disadvantage of presenting an insufficient protein capacity. One important requirement placed on ion exchangers which are to be used to a very high degree for chromatographic operation is that they should have the aforementioned high capacity. It can also be said with regard to ion-exchangers on the basis of fibre cellulose that when in the form of a bed or column they have the disadvantage of presenting a low separating ability for substance mixtures, whilst ion exchangers on the basis of microcrystalline cellulose when in the form of a bed or column afford too low a flow rate for a liquid flowing through the bed.

It has now proved possible essentially to reduce or avoid the disadvantages set forth above and thus to combine within one cellulose product the advantage of a high protein capacity with excellent flow properties and an excellent separating ability of a bed thereof. The advantage is obtained according to the invention if as a cellulose basic material in the ion exchangers according to the preamble of the description there is chosen a regenerated cellulose in the form of rounded particles, said particles containing 2–25% of cellulose, calculated as unsubstituted product in weight per volume, and presenting pores substantially in the range of from 2 to 2000 m$\mu$.

Such an unsubstituted cellulose product is previously known (our patent application No. 775,185). It is also previously known to use such a product in particle form as a separating medium for so-called gel filtration, that is a process of separation based on the ability of different substances of passing through a gel bed at different rates according to their molecular sizes. In this connection it has proved that particles of this cellulose product in the form of a bed or column afford a relatively good liquid flow. The fact that ion exchangers according to the preamble of the description on the basis of regenerated cellulose having the given properties would also obtain excellent flow properties is not very surprising in view of the prior art. Ion-exchangers similar to the present ones also known in which a copolymer of dextran with epichlorohydrin (cross-linked dextran) having such a degree of cross-linking that the water regain is 1–50 g./g. of dry substance serve as a carrier for the ion exchanging groups. As such ion exchangers present a relatively high porosity they will automatically also obtain a relatively high protein capacity. The fact that similar ion exchangers according to the invention, said ion exchangers also presenting a relatively high porosity, have a high protein capacity is therefore not very surprising either. Regarding the ion exchangers on the basis of cross-linked dextran, it is, however, known that if a relatively high porosity is to be reached in order to obtain a relatively high protein capacity, the water regain must be selected so high as to impart bad flow properties to the products. Moreover, the said ion exchangers present the great disadvantage that the ion exchanger particles after swelling in an aqueous liquid take a volume which is strongly dependent on the composition, for instance, the ionic strength or the organic solvents, of the aqueous liquid. This disadvantage increases with increasing water regain. Surprisingly enough it has now been found that with regard to flow properties and stability against changes of the composition of the aqueous liquid the present ion exchangers are entirely different from the ion exchangers on the basis of cross-linked dextran as they do not substantially change their volume upon changes in the composition of the aqueous liquid despite their high porosity. In view of the state of the art regarding cellulose ion exchangers and ion exchangers on the basis of cross-linked dextran it must thus be regarded as surprising that the present ion exchangers on the basis of regenerated cellulose having the given physical properties show a combination of preferred properties as indicated above, namely excellent flow properties, high stability against changes of ionic strength, high protein capacity and a high separating ability.

The present ion-exchangers are therefore superior to the ion-exchangers based on fibrous cellulose in terms of separation ability and protein capacity. They are superior to the ion-exchangers based on micro-crystalline cellulose in terms of flow properties and protein capacity and, compared to the ion-exchangers based on cross-linked dextran, they are superior in terms of flow properties and stability against changes in the aqueous environment.

According to the present invention the particles preferably have sizes falling mainly within the limits of from 0.01 to 1 mm.

As groups $R_1$ in the above formula particular mention may be made to methylene, ethylene, propylene or 2-hydroxypropylene. Radicals $R_2$, $R_3$ and $R_4$ are especially hydrogen, methyl, ethyl, 2-hydroxyethyl, propyl, 2-hydroxypropyl, butyl or 2-hydroxybutyl.

The present invention also relates to a method for the preparation of the ion exchangers set forth above. The method according to the invention is characterized in that regenerated cellulose in the form of rounded particles, said particles containing 2–25% of cellulose, calculated in weight per volume, and having pores mainly in the range 2 to 2000 m$\mu$, are reacted with a substance of the formula $XR_1Z$, wherein X is halogen or oxygen forming together with a carbon atom in 2-position of the alkylene chain an oxirane group, in the presence of an alkaline reacting substance. If X is a halogen atom then hydrogen halide will be split off, which is accepted by the alkaline substance. If X is an oxygen atom a hydrogen atom from the cellulose will add with the oxygen to form a hydroxyl group in 2-position. This reaction is entirely catalytic.

According to the invention, the cellulose can be cross-linked in order to increase the rigidity of the particles. As an agent to effect the cross-linking reaction may be used divinyl benzene or compounds of the general formula X'—R—Y, wherein R is an aliphatic residue, containing 3—10 carbon atoms, and X' and Y each are a halogen atom or an epoxy group forming an oxirane group together with two adjacent atoms of the residue R. The reaction is preferably carried out in alkaline medium. Examples of suitable bifunctional organic substances useful for the cross-linking reaction are epichlorohydrin, dichlorohydrin, 1,2,3,4-diepoxybutane, bis-epoxypropyl ether, ethylene glycol-bis-epoxy propyl ether and 1,4-butandiol-bis-epoxypropyl ether, and closely related compounds.

The aliphatic chains forming the cross-linking bridges of the cross-linked cellulose are accordingly substituted, preferably with hydroxy groups, and/or interrupted by other atoms, preferably oxygen atoms.

The cross-linking of the cellulose may be performed before or after the introduction of the groups —$R_1$—Z into the cellulose.

The invention will now be described with reference to some examples.

EXAMPLE 1

(A) 200 g. of cellulose xanthogenate containing 60 g. of cellulose (type "Avicel" from American Viscose Corp., U.S.A., having a degree of polymerisation of 220) were dissolved in 1000 g. of 5% solution of sodium hydroxide.

500 ml. of the cellulose xanthogenate solution were emulsified at 20° C. in 500 ml. ethylene dichloride by means of an anchor stirrer (320 r.p.m.) and 1·1 g. of celluloseacetatebutyrate as an emulsifier. When the droplets of cellulose xanthogenate had obtained the desired sizes, the temperature of the emulsion was increased to 80° C. and maintained at this value for one hour. After cooling down to room temperature 320 g. of benzoic acid dispersed in 300 ml. of ethylene dichloride were added.

The regenerated cellulose was washed first 5 times with acetone to which had been added water in such an amount that the sodium benzoate was prevented from forming a gel. The cellulose was then washed with water after which it was treated with diluted sulphuric acid at 70° C. After washing off the sulphuric acid with water the cellulose was treated with a dilute solution of sodium hydroxide after which the sodium hydroxide was washed away with water, the temperature being during all stages maintained at 70° C.

The product as obtained was regenerated cellulose in the form of rounded particles having a size mainly in the range of 0.056–0.315 mm. The particles contained 8 g. of cellulose per decilitre and had such a pore size that dextran having a molecular weight up to about 100.10$^6$ could penetrate into the particles.

(B) Cellulose pearls obtained in the manner set forth above were dewatered by treatment with acetone and dried in vacuum at 50° C. for 4 hours.

10 g. of dried cellulose pearls were dispersed in 50 ml. of toluene together wtih 100 mg. of benzethonium chloride. To the dispersion there was then added 1.8 g. of sodium hydroxide and 100 mg. of sodium boron hydride dissolved in 20 ml. of water, followed by 5 g. of sodium chloroacetate. The temperature of the suspension was then increased to 70° C., after which the components were permitted to react for 3 hours with agitation. After decanting the toluene, the product was dispersed first in diluted ethanol and then in water. The cellulose pearls were then treated wtih a 0.5 M solution of sodium hydroxide after which they were washed to neutral reaction with water.

The product as obtained weighed 11 g. and had an ion exchange capacity of 1.1 meq./g.

Other properties of the product are evident from the enclosed table.

EXAMPLE 2

Cellulose pearls obtained according to Example 1(A) were dewatered by treatment with acetone and dried in vacuum at 50° C. for 4 hours.

15 g. of dried cellulose pearls obtained in the above identified manner were dispersed in 75 ml. of toluene together with 200 mg. of benzethoniumchloride. To the dispersion were then added 2 g. of sodium hydroxide and 200 mg. of sodium boronhydride dissolved in 38 ml. of water, after which 6 g. of propane sultone were charged in small portions. The suspension was then reacted for 24 hours at room temperature, after which the toluene was decanted and the product dispersed in dilute ethanol. The cellulose pearls were then washed with water, treated with 0.1 M solution of sodium hydroxide and finally washed with water to neutral reaction.

The product as obtained weighed 14 g. and presented an ion exchange capacity of 0.8 meq./g. Other properties of the product are evident from the enclosed table.

EXAMPLE 3

Cellulose pearls obtained in the same manner as in Example 1(A) were dewatered by treatment with acetone and dried in vacuum for 4 hours at 50° C.

25 g. of dried cellulose pearls obtained in the above given manner were dispersed in 125 ml. of toluene together with 250 mg. of benzethonium chloride. To the dispersion were then added 2.3 g. of sodium hydroxide and 250 mg. of sodium boron hydride dissolved in 50 ml. of water, after which 9.5 g. of diethylaminoethylchloride hydrochloride were charged within the course of 30 minutes. Then 1.4 g. of sodium hydroxide dissolved in 7 ml. of water were added dropwise for 5 minutes.

The temperature was then increased to 60° C. and the suspension reacted for 15 hours. The reaction mixture was then cooled to room temperature and 1.7 ml. of concentrated hydrochloric acid were added after which 19.5 ml. of propylene oxide were added dropwise. The reaction was then permitted to proceed for 10 hours at 45° C., after which the toluene was decanted and the product dispersed in dilute ethanol and acidified with hydrochloric acid to pH=4. The cellulose pearls were then washed with water, treated with an aqueous 0.5 M solution of hydrochloric acid, after which they were washed to neutral reaction with water.

The product obtained weighed, dried as above, 26 g. and had an ion exchange capacity of 1.0 meq./g. and a degree of quaternization amounting to about 80%. Other properties of the product are evident from the enclosed table.

EXAMPLE 4

185 g. of cellulose pearls comprising 15 g. of dried substance and prepared according to Example 1A were dispersed in a solution consisting of the following ingredients: 125 ml. of water, 6 g. of sodium hydroxide and 200 mg. of sodium boron hydride. There were then added 13 g. of diethylaminoethylchloride hydrochloride in small portions during 30 minutes, after which the ingredients were reacted with each other for 16 hours at 60° C. The mixture was then acidified with hydrochloric acid to pH=4, after which the cellulose pearls were washed with water, treated with an (aqueous) 0.5 M solution of hydrochloric acid, after which they were washed to neutral reaction with water.

The ion exchange capacity of the product as obtained was 0.95 meq./g. of dried substance. Other properties are evident from the enclosed table.

EXAMPLE 5

(A) 500 ml. of viscose solution containing 5% of cellulose (type "Avicel" from American Viscose Corp., U.S.A., having a degree of polymerisation amounting to 220) were emulsified into a solution of 11 g. of cellulose acetate butyrate in 500 ml. of ethylene dichloride by agitation with a turbine stirrer at 320 revolutions per minute. After about 15 minutes 160 g. of acetic acid were added at room temperature. The cellulose pearls thus regenerated were first washed with acetone 5 times to remove the cellulose acetate butyrate and then treated with dilute sulphuric acid at 70° C. After washing away the sulphuric acid with water the pearls were treated with a dilute aqueous solution of sodium hydroxide at 70° C., after which the sodium hydroxide was washed away with water. The product as obtained contained 18 g. per decilitre of cellulose and had such a pore size that dextran having a molecular weight up to about 100 million could penetrate into the particles. The grains were rounded having a size within the range of 0.056 to 0.250 mm.

(B) Cellulose pearls obtained in the above identified manner were dewatered by treatment with acetone and dried in vacuum at 50° C. 4.5 g. of a dried product were dispersed in 22.5 ml. of toluene together with 45 mg. of benzethoniumchloride. Then 7.5 g. of diethylaminoethylchloride hydrochloride were added followed by a solution of 3.6 g. of sodium hydroxide and 45 mg. of sodium boron hydride in 11.5 ml. of water. The suspension was then reacted at 60° C. for 75 minutes after which the toluene was decanted and the product dispersed in ethanol and neutralized with hydrochloric acid. It was then washed with water, treated with an aqueous 0.5 M hydrochloric acid, after which it was washed neutral with water. The product as obtained had an ion exchange capacity of 1.0 meq./g. and a protein capacity of 1.5 g. of hemoglobin per meq. ion exchange capacity.

EXAMPLE 6

(A) In the same manner as given in Example 5A rounded particles of regenerated cellulose were first prepared from a cellulose having a degree of polymerisation of 900 (type "Cordicel Super 20" from Uddeholm AB, Sweden). The product presented a content of cellulose amounting to 18.5 g./dl. and had such a pore size that dextran having a molecular weight up to about one million could penetrate into the particles. The particles had sizes mainly in the range of from 0.04 to 0.080 mm.

(B) A product substituted with diethylaminoethyl groups was then prepared in the same manner as given in Example 5B except that the reaction time was only 65 minutes. The product as obtained had an ion exchange capacity of 1.1 meq./g. of dry solids. Other properties are evident from the enclosed table.

EXAMPLE 7

(A) 12 g. of cellulose powder (type Munktell 400 from Grycksbo Pappersbruk, Sweden) were dissolved in 300 ml. of ammonium hydroxide to which 7.2 g. of copper-II-hydroxide and 0.75 g. of copper-I-chloride had been added, whilst stirring for 4.5 hours at 23° C.

The cellulose solution was then emulsified at room temperature in 400 ml. of toluene, in which 8 g. of Cremophor EL (a condensation product of Risinus fatty acids and ethylene oxide from Badische Anilin- und Sodafabrik, The Federal Republic of Germany) were dissolved. The cellulose solution was added dropwise for 5 minutes at an agitator speed of 1250 r.p.m.

The emulsion was then poured in a thin jet into a well stirred regenerating bath consisting of 9 litres of toluene to which were added 750 g. benzoic acid. Subsequent to adding all the emulsion, the agitation was continued for a further 10 minutes, whereafter the regenerated cellulose pearls and the precipitated ammonium benzoate were allowed to sediment for about 15 hours. Subject to removal of overlying liquid by suction, a solution of 120 g. sodium hydroxide in 3 litres of water were added and the mixture stirred until all the ammonium benzoate was dissolved. The pearls were then washed with water on a 40 $\mu$m. screen, whereafter they were dispersed in 300 ml. of 50% acetic acid to remove residual copper, and rewashed with water on a screen (40 $\mu$m.).

The obtained product comprised a regenerated cellulose in the form of round grains having a size essentially between 0.050 and 0.200 mm. The grains contained 6.7 g. cellulose per decilitre and had such a pore size that dextran having a molecular weight up to about $10^7$ could penetrate the particles.

(B) Cellulose pearls obtained in the aforedisclosed manner were dewatered by treatment with acetone and dried in vacuum at 50° C. for 4 hours.

15 g. of dried cellulose pearls were dispersed in 75 ml. of toluene together with 150 mg. benzethoniumchloride. Then 7.5 g. of sodium chloroacetate, dissolved in 27 ml. of water were added to the dispersion. After 30 minutes 2.8 g. of sodium hydroxide and 150 mg. of sodium boron hydride dissolved in 3 ml. of water were added, whereafter the temperature was raised to 70° C. and the components reacted for 3 hours at this temperature. The pearls were then worked up in the manner described in Example 1B.

The obtained product had an ion exchange capacity of 1.0 meq./g. of dry substance. Other characteristics are evident from the table.

EXAMPLE 8

Cellulose pearls obtained in the same manner as described in Example 1A were dewatered by treatment with acetone and dried in vacuum at 50° C. for 4 hours.

50 g. of dried cellulose pearls obtained in the above given manner were dispersed in 300 ml. of toluene together with 500 mg. of benzethonium chloride. To the dispersion were then added 72 g. of chloromethyl phosphonic acid, whereafter 60 g. of sodium hydroxide and 500 mg. of sodium boron hydride dissolved in 60 ml. of water were added by shares within the course of 30 minutes.

The temperature was then increased to 90° C. and the suspension reacted for 16 hours. The reaction mixture was cooled to room temperature and the toluene decanted, whereafter the product was dispersed in dilute ethanol at first and then in water. Then the pearls were treated with 0.5 M sodium hydroxide, whereafter they were washed to neutral reaction using water.

The product obtained weighed, dried as above, 55 g. and had an ion exchange capacity of 0.8 meq./g. The flow amounted to 150 cm./h. and the change in volume upon a change in ionic strength from 0.1 to 0.5 was 4%.

EXAMPLE 9

200 ml. of settled gel prepared according to Example 4 and comprising 15 g. of dried substance were freed of water by suction on a filter and then dispersed twice in 0.5 M sodium hydroxide. After removal of water by suction on a filter the pearls soaked with alkali were dispersed in 225 ml. of toluene in which 1.5 g. of benzethonium chloride were dissolved. The temperature was increased to 50° C. and after 20 minutes 10 g. of epichlorohydrin were added. After 30 minutes the reaction was cut off and the product dispersed into dilute ethanol. Then the mixture was acidified to pH 4 using hydrochloric acid, whereafter the cellulose pearls were washed with water to neutral reaction.

The ion exchange capacity of the obtained product was found to be 0.8 meq./g. Other properties are evident from the enclosed table.

The following tests were made to establish the properties of the obtained products.

Flow

The maximum flow of a packed bed of diameter 5 cm. and height 10 cm. was measured. For products consisting of rounded particles, the flow measured experimentally was converted to a standardized average particle size of 0.100 mm., because it is known that the flow in such cases is directly proportional to the square of the average particle size.

Protein capacity

The ion exchanger was packed to form a bed having a diameter of 1.5 cm. and height of about 3 cm. As a buffer was used 0.05 M tris-(hydroxymethyl)-aminomethane (Tris) the pH of which was adjusted to 8.0 with hydrochloric acid for the anion exchangers and an acetate buffer having the ionic strength 0.01 and pH 5.0 for the cation exchangers. A solution of bovine carbonmonoxy hemoglobin prepared according to Prinz (J. Chromatog. 2(1959) 445) was diluted in the ratio 1:25 in the respective buffers and was permitted to flow through the bed until the charged solution had the same concentration as the discharged solution. The bed was then washed free from any excess of protein with the respective buffers. The adsorbed protein was then eluted in respect of anion exchangers with 0.10 H Tris, the pH of which had been adjusted to 7.2 with hydrochloric acid containing 1.0 M sodium chloride and, in respect of cation exchangers, with an acetate buffer having the ionic strength 0.1 and pH 5.0 to which had been added 1 M sodium chloride. The amount of eluted protein was determined by a spectrophotometric method and the amount of ion exchanger was determined by drying the bed after all salts and any remaining protein had been washed away. In the enclosed table the protein capacity is calculated as mg. hemoglobin adsorbed per milliequivalent as being the most proper measure of the adsorption efficiency.

Separating ability and stability against changes in ionic strength

The ion exchanger was packed to a bed of 1.5 cm. in diameter and a height of about 10 cm. As a buffer was used 0.1 Tris-hydrochloric acid with pH 8.3 for the anion exchangers and an acetate buffer with pH 5.0 and the ionic strength 0.1 for the cation exchangers. The bed was then charged with 2 ml. of a solution of hemoglobin prepared in the aforedescribed manner and diluted 1:10 with the buffer concerned. A gradient vessel of conventional type consisting of two cylindrical chambers was used, one of which chambers was filled with the respective buffer and the other with the respective buffer to which had been added 1.0 M sodium chloride. The bed was eluted by pumping liquid as a rate of about 0.2 ml. per minute from the gradient vessel. The protein concentration in the eluate was registered spectrophotometrically on a recording diagram and the ionic strength of the eluate was determined by chloride titration in the discharged fractions. The separating ability was assessed from the diagram. The bed height was determined at the end of the test when the ionic strength was about 0.4. The shrinkage of the bed after changing the ionic strength was determined from these data.

In the case of sulphopropyl cellulose the starting buffer was a phosphate buffer having an ionic strength of 0.05 and a pH value of 7.0. The test substances used were 200 mg. of ribonnuclease and 40 mg. of cytochrome C dissolved in 2 ml. of starting buffer. The sodium chloride solution used for elution had a molarity of 1.5 instead of 1.0. The final ionic strength was therefore 0.65.

| Product | Type | Ion exchanger group | Flow, cm./h. | Protein capacity reversible CO-hemoglobin adsorption Hb-cap mg. tot. cap meq. | Separation ability | Shrinkage,[1] percent |
| --- | --- | --- | --- | --- | --- | --- |
| Whatman DE 23 | Fibre | DEAE | 1,300 | 340 | Not good | 0 |
| Whatman DE 52 | Micro-crystalline | DEAE | 50 | 480 | Very good | 5 |
| DEAE-Sephadex A-50 | Cross-linked dextran | DEAE | 10 | 1,380 | do | 35 |
| Example: | | | | | | |
| 4 | Present invention | DEAE | 105 | 620 | do | 3 |
| 6 | do | DEAE | 300 | 760 | Good | 0 |
| 1 | do | Carboxymethyl | 130 | 1,270 | do | 2 |
| 2 | do | Sulfopropyl | 130 | 2,060 | Very good | 6 |
| 3 | do | {$R_2$=ethyl, $R_3$=ethyl, $R_4$=2-hydroxypropyl} | 140 | 800 | do | 1 |
| 7 | do | Carboxymethyl | 120 | 1,150 | Good | 0 |
| 9 | do | DEAE | 190 | 600 | Very good | 0 |

[1] Given as $100 - \dfrac{\text{final bed volume, l. ml.}}{\text{bed volume at start, ml.}} \cdot 100$

What we claim is:

1. An ion-exchanger consisting of rounded particles of regenerated cellulose substituted by groups of the formula —$R_1$—Z, wherein $R_1$ stands for a lower alkylene group, containing 1–3 carbon atoms and optionally substituted with a hydroxy group, and Z stands for a carboxylic, sulfo or phosphono group, or salt thereof, or an amino group of the formula

or a quaternized amino group of the formula

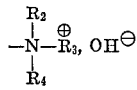

or salts thereof, wherein $R_2$, $R_3$ and $R_4$ each stand for hydrogen or an optionally hydroxyl group-substituted lower alkylene group, containing 1–4 carbon atoms, the substitution degree corresponding to an ion exchange capacity within the limits of 0.2–1.8 milliequivalents per gram of dry substance, said particles containing from 2 to 25 percent of cellulose, calculated as unsubstituted product in weight per volume, and presenting pores substantially in the range of from 2 to 2000 m$\mu$.

2. An ion exchanger as claimed in claim 1, wherein the particles have sizes mainly in the range of from 0.01 to 1 mm.

3. An ion exchanger as claimed in claim 1, wherein the cellulose is cross-linked in order to increase the rigidity of the particles.

4. An ion exchanger as claimed in claim 3, wherein the cellulose has been cross-linked with divinyl benzene or a compound of the general formula X'—R—Y wherein R is an aliphatic residue, containing 3–10 carbon atoms, and X' and Y each are a halogen atom or an epoxy group forming an oxirane group together with two adjacent atoms of the residue R.

5. An ion exchanger as claimed in claim 4, wherein the compound of the general formula is epichlorohydrin.

6. An ion exchanger as claimed in claim 1, wherein the cellulose is cross-linked in order to increase the rigidity of the particles and the particles have sizes mainly in the range of from 0.01 to 1 mm.

7. An ion exchanger as claimed in claim 6, wherein the cellulose has been cross-linked with divinyl benzene or a compound of the general formula X'—R—Y, wherein R is an aliphatic residue containing 3–10 carbon atoms and X' and Y each are a halogen atom or an epoxy group forming an oxirane group together with two adjacent atoms of the residue R, 8. An ion exchanger as claimed in claim 7, wherein the compound of the general formula X'—R—Y is epichlorohydrin.

9. An ion exchanger as set forth in claim 1, wherein the substitition degree corresponds to an ion exchange capacity within the limits of 0.5–1.2 milliequivalents per gram of dry substance.

References Cited

FOREIGN PATENTS 936,039  9/1963  Great Britain.
1,013,585  12/1965  Great Britain.

MELVIN GOLDSTEIN, Primary Examiner

U.S. Cl. X.R.

260—2.1 R, 2.2 R, 231 A